United States Patent
Pauls et al.

(10) Patent No.: US 7,595,282 B2
(45) Date of Patent: *Sep. 29, 2009

(54) METHODS AND COMPOSITIONS OF CONTROLLING THE RHEOLOGY OF A DIUTAN-CONTAINING WELL TREATMENT FLUID AT HIGH TEMPERATURES

(75) Inventors: Richard W. Pauls, Duncan, OK (US); Ian Robb, Duncan, OK (US); Bobby Burns, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 492 days.

This patent is subject to a terminal disclaimer.

(21) Appl. No.: 11/077,881

(22) Filed: Mar. 11, 2005

(65) Prior Publication Data

US 2006/0205606 A1 Sep. 14, 2006
US 2008/0220992 A9 Sep. 11, 2008

Related U.S. Application Data

(63) Continuation-in-part of application No. 10/850,128, filed on May 20, 2004.

(51) Int. Cl.
  *E21B 43/22* (2006.01)
  *E21B 43/26* (2006.01)
  *C09K 8/68* (2006.01)
  *C09K 8/74* (2006.01)

(52) U.S. Cl. .................. 507/211; 166/270.1; 166/275; 166/305.1; 507/269; 507/277

(58) Field of Classification Search ................ 507/211, 507/269, 277; 166/270.1, 275, 305.1
See application file for complete search history.

(56) References Cited

U.S. PATENT DOCUMENTS

| | | | | |
|---|---|---|---|---|
| 2,935,129 A | * | 5/1960 | Allen et al. | 166/308.3 |
| 4,326,052 A | | 4/1982 | Kang et al. | 536/1 |
| 4,381,241 A | * | 4/1983 | Romenesko et al. | 507/127 |
| 4,401,760 A | | 8/1983 | Peik et al. | 435/101 |
| 4,455,241 A | * | 6/1984 | Swanson | 507/211 |
| 5,175,278 A | | 12/1992 | Peik et al. | 536/123 |
| 6,110,875 A | | 8/2000 | Tjon-Joe-Pin et al. | 507/201 |
| 6,196,320 B1 | * | 3/2001 | Ray et al. | 166/312 |
| 6,573,221 B2 | | 6/2003 | Talashek et al. | 507/110 |
| 6,620,775 B2 | | 9/2003 | Winston et al. | 510/470 |
| 2005/0261138 A1 | * | 11/2005 | Robb et al. | 507/209 |
| 2008/0194428 A1 | * | 8/2008 | Welton et al. | 507/90 |

OTHER PUBLICATIONS

U.S. Appl. No. 10/850,128, filed May 20, 2004, Robb, et al.

* cited by examiner

*Primary Examiner*—Timothy J. Kugel
(74) *Attorney, Agent, or Firm*—Robert A. Kent; Booth Albanesi Schroeder LLC (57) ABSTRACT

The invention provides a method for treating a subterranean formation penetrated by a wellbore, the method comprising the steps of formulating a treatment fluid and introducing the treatment fluid through the wellbore. The treatment fluid comprises water; diutan; and a sufficient amount of salt to increase the density of the treatment fluid to at least 8.5 lb/gal, wherein at least 50% by weight of the salt is selected from the group consisting of: bromide salts, non-bromide salts having a higher salting-in effect than bromide according to the Hofmeister series as measured by the salt's effect on the cloud point of poly(ethylene oxide) that has a molecular weight of $4\times10^6$, and any combination in any proportion thereof. The invention also provides a treatment fluid for use in a subterranean formation penetrated by a wellbore, the treatment fluid comprising: water; diutan; and a sufficient amount of salt to increase the density of the treatment fluid to at least 8.5 lb/gal, wherein at least 50% by weight of the salt is selected from the group consisting of: bromide salts, non-bromide salts having a higher salting-in effect than bromide according to the Hofmeister series as measured by the salt's effect on the cloud point of poly(ethylene oxide) that has a molecular weight of $4.10^6$, and any combination in any proportion thereof.

10 Claims, 8 Drawing Sheets

METHODS AND COMPOSITIONS OF CONTROLLING THE RHEOLOGY OF A DIUTAN-CONTAINING WELL TREATMENT FLUID AT HIGH TEMPERATURES

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The invention generally relates to methods and compositions for treating a subterranean formation penetrated by a wellbore. More specifically, the invention relates to compositions and methods for controlling the rheology of a diutan-containing well treatment fluid at high temperatures.

BACKGROUND OF THE INVENTION

A well treatment fluid for use in a subterranean formation penetrated by a wellbore is generally prepared by mixing a base fluid and a viscosifying agent. The base fluid is made up of an aqueous fluid and can be of any convenient source, including, but not limited to fresh water, seawater, natural brine and formulated brines such as 2% KCl solution. The viscosifying agent thickens or viscosifies the base fluid and may assist in the transport of solid particles in the fluid. A typical viscosifying agent includes or is made from a polysaccharide.

Polysaccharides have been used to alter the viscosity and rheology of aqueous solutions and are typically used in drilling, completion, and remedial operations. Among other uses, polysaccharides may be used as a part of fracturing gels for hydraulic fracturing, to viscosify drilling fluids, to control fluid loss, as blocking gels, as a part of gravel packing, frac pack fluids, etc. Heteropolysaccharides, in particular, have been used to alter the viscosity and other rheological characteristics of aqueous solutions as well as for secondary functions, such as emulsification, suspension of solids, stabilization, flocculation, etc. See, for example, the many applications of heteropolysaccharides in U.S. Pat. No. 4,326,052 filed Aug. 14, 1990, and U.S. Pat. No. 4,401,760 filed Oct. 21, 1981, both assigned to Merck & Co., Inc, which are hereby incorporated by reference in their entirety.

However, a treatment fluid can suffer a complete loss of viscosity under certain conditions to which it may sometimes be subjected in treating a subterranean formation. Examples of such conditions include high shear (caused by the pumping and placement), high temperatures, high pressure, high salinity, and low pH. Under such conditions, the polymeric material used to viscosify the treatment fluid may degrade rather quickly and lose its viscosifying properties.

In fact, many heteropolysaccharides are ineffective at temperatures above 80° C. Xanthan, in particular, is commonly used to viscosify treatment fluids for applications such as gravel packing, but becomes less effective above 80-90° C.

In order to maintain reservoir fluid control and formation/fluid compatibility, the density of the fluid may be controlled by addition of soluble materials such as salts. These salts can also contribute to loss in viscosity of the treatment fluid.

Accordingly, there is a need for a viscosifying agent that provides high stability in a treatment fluid at elevated temperatures in solutions containing electrolytes.

SUMMARY OF THE INVENTION

The invention provides a method for treating a subterranean formation penetrated by a wellbore, the method comprising the steps of formulating a treatment fluid and introducing the treatment fluid through the wellbore.

The treatment fluid comprises water; diutan; and a sufficient amount of salt to increase the density of the treatment fluid to at least 8.5 lb/gal, wherein at least 50% by weight of the salt is selected from the group consisting of: bromide salts, non-bromide salts having a higher salting-in effect than bromide according to the Hofmeister series as measured by the salt's effect on the cloud point of poly(ethylene oxide) that has a molecular weight of $4\times10^6$, and any combination in any proportion thereof.

The invention also provides a treatment fluid for use in a subterranean formation penetrated by a wellbore, the treatment fluid comprising: water; diutan; and a sufficient amount of salt to increase the density of the treatment fluid to at least 8.5 lb/gal, wherein at least 50% by weight of the salt is selected from the group consisting of: bromide salts, non-bromide salts having a higher salting-in effect than bromide according to the Hofmeister series as measured by the salt's effect on the cloud point of poly(ethylene oxide) that has a molecular weight of $4\times10^6$, and any combination in any proportion thereof.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying figures together with the description are incorporated into and form a part of the specification to illustrate several principles of the present inventions. The figures are only for illustrating the principles of the inventions and are not to be construed as limiting the inventions to the illustrated and described examples. The various advantages and features of the present inventions will be apparent from the description of the invention and a consideration of the drawing in which.

DETAILED DESCRIPTION OF THE PREFERRED EMBODIMENTS

The invention provides a method for treating a subterranean formation penetrated by a wellbore. The treatment fluid of the invention relates to aqueous wellbore treatment fluids. The water used for the treatment fluid can be of any convenient or desired source, such as fresh water, seawater, natural brine, formulated brines, and any combination in any proportion thereof. Formulated brine is manufactured by dissolving one or more soluble salts in water, natural brine, or seawater. Representative soluble salts include the chloride, bromide, sulphate, nitrate, acetate or formate salts of potassium, sodium, ammonium, calcium, magnesium and zinc. Considering the principles of the invention, as explained herein, the treatment fluid preferably includes bromide salts over nitrate, sulphate, formate, and chloride salts.

Diutan is one type of heteropolysaccharide that has improved viscosity retention at elevated temperatures when compared to traditional polymeric rheology modifiers such as xanthan. Diutan's thickening, suspending, and stabilizing properties in aqueous fluids makes it especially useful as suspension systems in gravel packing. Referred to as heteropolysaccharide S-657, diutan is prepared by fermentation of a strain of *Sphingomonas* sp. ATCC 53159. Details on preparing diutan may be found in U.S. Pat. No. 5,175,278, filed Sep. 4, 1990 by Jerry A. Peik, Suzanna M. Steenbergen, and George T. Veeder, hereby incorporated by reference in its entirety. Diutan is composed principally of carbohydrate, about 12% protein and about 7% (calculated as O-acetyl) acyl groups, the carbohydrate portion containing about 19% glucuronic acid, and the neutral sugars rhamnose and glucose in the approximate molar ratio of 3:2. Other details on diutan can be found in U.S. Pat. No. 6,620,775, filed Nov. 26, 2001 by Philip E. Winston and John M. Swazey, hereby incorporated by reference in its entirety. Diutan can be obtained from CP Kelco US Inc. (Houston), the commercial name being Geovis.

The amount of diutan in the treatment fluid is selected to be sufficient to provide a desired rheology. If used in a gravel packing fluid, the treatment fluid contains diutan in an amount sufficient to provide suspension of particulates such as sand. For example, the amount of diutan in the gravel packing fluid can range from about 0.01% to about 2.0% by weight and preferably between 0.1% to about 1.0%. Other diutan concentrations are also contemplated for various subterranean formation applications.

It has been discovered that the performance of diutan is significantly affected by the salt content and, unusually for a polysaccharide, salt type. By careful selection of salts for the diutan-containing treatment fluid, one can maintain the desirable rheological properties of the treatment fluid in higher temperatures, especially above 80° C.

Figure 1:
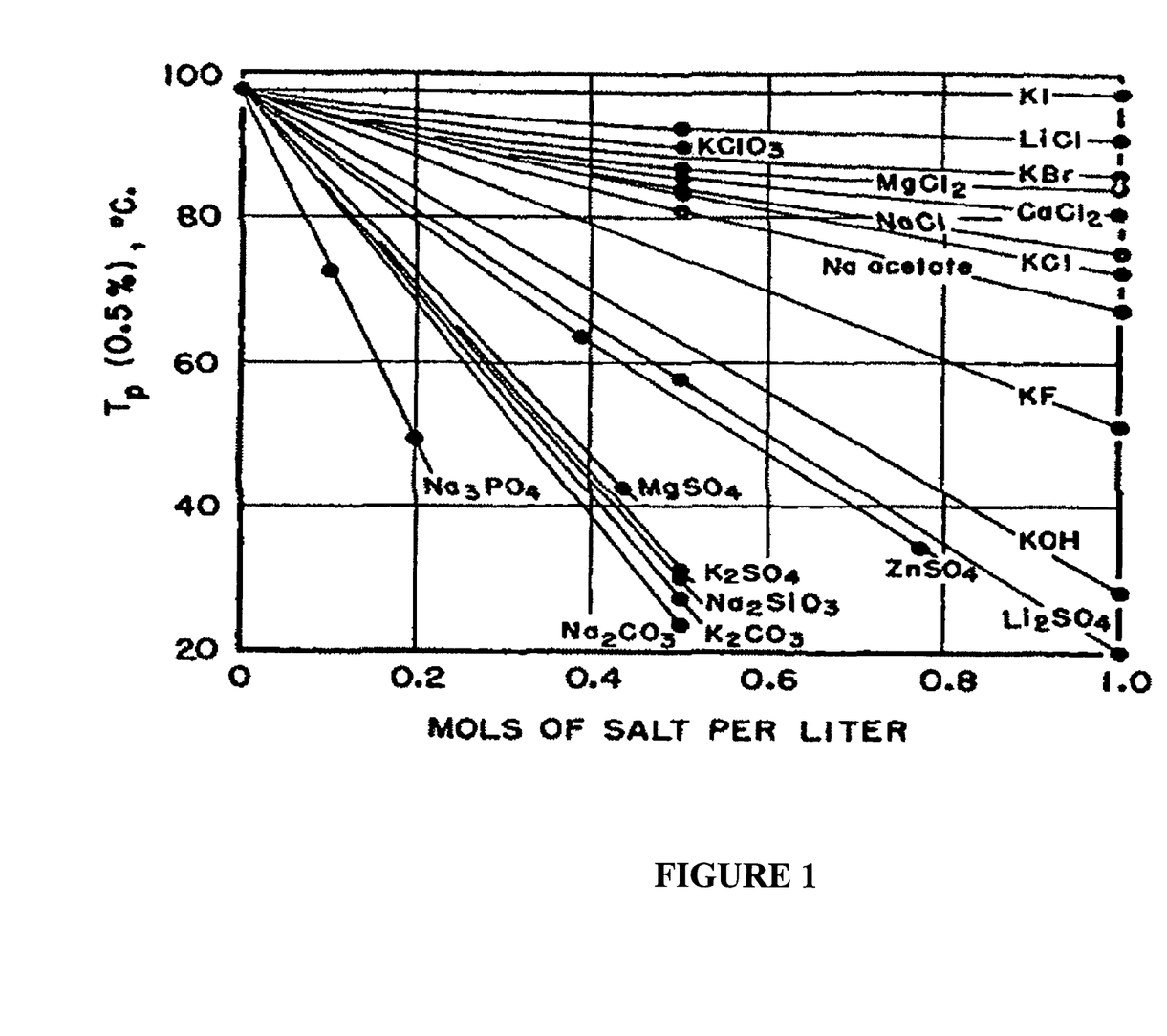
FIG. 1 illustrates a graph of the temperature at which a 0.5% solution of poly(ethylene oxide), having a molecular weight of $4\times10^6$ becomes insoluble, in concentration of various salts, where salt concentration is measured in molarity (M).

A discussion will now follow on the Hofmeister series, which arises from the solubility properties of polymers in salt solutions. Turning initially to FIG. 1, illustrated is a graph of the temperature at which a 0.5% solution of poly(ethylene oxide) or "PEO", having a molecular weight $4 \times 10^6$ becomes insoluble in various salts, where salt concentration is measured in moles of salt per liter. The graph, taken from Bailey and Callard, J. Applied Polymer Sci., 1959; vol 1; p. 56, illustrates the "salting-in" and "salting-out" ability of salts according to the Hofmeister series, as measured by their effect on the cloud point of PEO.

The salting-in and salting-out effect depends on the nature of the ions, mainly anions and to a lesser extent, cations, involved. Referring to the Table 1 below, the most effective salting-out anions progress, increasingly, to the left of the table. The salting-out effect, or ability to precipitate PEO, is usually found for proteins and hydrophobic polymers, but not for polysaccharides like xanthan or guar. It is the unexpected salting-in effect of certain salts with diutan that provides a new method of controlling the rheology of a diutan-containing treatment fluid at temperatures above 80° C. With respect to the potassium salts, for example, the order of decreasing salting-out effect is $SO_4^= \sim CO_3^= > OH^- > F^- > Br^{---} > I^-$. Table 1 illustrates the most effective salting-in anions progressing, increasingly, to the right of the table. Thus, 'salting-in' effect, or ability to solubilize PEO, refers to an increase in solubility on the addition of salt.

TABLE 1

Effect of Salts on Temperature of Precipitation of PEO in Water

← Increasing precipitation, or "salting-out" effect
Increasing chaotropic, or "salting-in" effect →
Anions: $PO_4^{3-} > SO_4^{2-} > HCOO^- > CH_3COO^- > Cl^- > NO_3^- > Br^- > ClO_4^- > I^- > SCN$ As suggested by its name, the "cloud point" is the temperature at which a 0.5% solution of PEO will become insoluble (indicated by the change of the solution from clear to cloudy). In pure water, the temperature at which a 0.5% solution of PEO will become insoluble is about 98° C. On the addition of various salts, this temperature is lowered. The lower the cloud point is for the salt, the less soluble the PEO is in the solution. The Hofmeister series is well known, and reference can be made to, for example, Bailey and Callard, J. Applied Polymer Sci., 1959; vol 1; p. 56; P. von Hippel and T. Schleich, *Structure & Stability of Biological Macromolecules*, Marcel Dekker New York, 1969 Chapter 6; and M. Salomaki et al, *Langmuir* (2004) 20, 3679.

Preferably, the salts of the Hofmeister series for use in the invention are selected from the group consisting of bromides; other salts having a higher salting-in effect than bromide according to the Hofmeister series as measured by the salt's effect on the cloud point of poly(ethylene oxide) that has a molecular weight of $4 \times 10^6$; and any combination in any proportion thereof. Also within the scope of the invention are anions with a salting-in effect according to the Hofmeister series such as iodide, thiocyanate and perchlorate, as well as mixtures of the salts with different anions and/or cations.

The amount of salt in the solution is selected to be sufficient to provide the desired density in the treatment fluid. In one aspect of the invention, a sufficient amount of salt is added to the treatment fluid to increase the density of the treatment fluid to at least 8.5 lb/gal, wherein at least 50% by weight of the salt is selected from the group consisting of: (i) bromide salts, (ii) non-bromide salts having a higher salting-in effect than bromide according to the Hofmeister series as measured by the salt's effect on the cloud point of poly(ethylene oxide) that has a molecular weight of $4\times10^6$, and (iii) any combination in any proportion thereof. Preferably, the salt comprises at least 50% by weight of salt selected from the group consisting of potassium bromide, sodium bromide, ammonium bromide, zinc bromide, and calcium bromide.

Preferably, less than 50% by weight of the salt is selected from salts such as nitrates, chlorides, formates, and sulfates, which are more of the salting-out salts.

This invention is particularly advantageous in gravel packing applications. In gravel packing, it is sometimes desirable to be able to pump a suspension of sand or other particulate into the wellbore without the components of the suspension blocking the rock formation being treated. For this reason, the polymers suitable for suspending sand are tested by being pumped into a permeable rock core, and the pressure required for the polymers to be pumped through the permeable rock core is used as a criterion for the polymer's suitability. A suitable polymer is capable of being pumped through a permeable rock without blocking pores. Such a blockage would cause either the flow rate through the permeable rock to decline (at constant pressure), or the pressure to rise at constant flow rate. As described below, standard tests of pumping diutan solutions through rock cores show the benefit of certain salts in preference to others.

To demonstrate the advantage of diutan in higher salting-in salts, the rheology of solutions of 0.4% diutan in 3M salts was measured. An original elastic modulus (indicated as G' and measured in Pascals "Pa") was measured at 20° C., and a recovered elastic modulus was measured at 20° C. after the test solution has been: gradually heated from 20° C. to 120° C. at an overall rate of about 3° C. per minute over a period of about 30 minutes, held at 120° C. for about 10 minutes, cooled from 120° C. back down to about 30° C. or 40° C. at an overall rate of about minus 3° C. per minute over about 30 minutes, and the held at about 30° C. or 40° C. for about 30 minutes, the arrows indicate the heating and cooling cycles.

Figure 2:
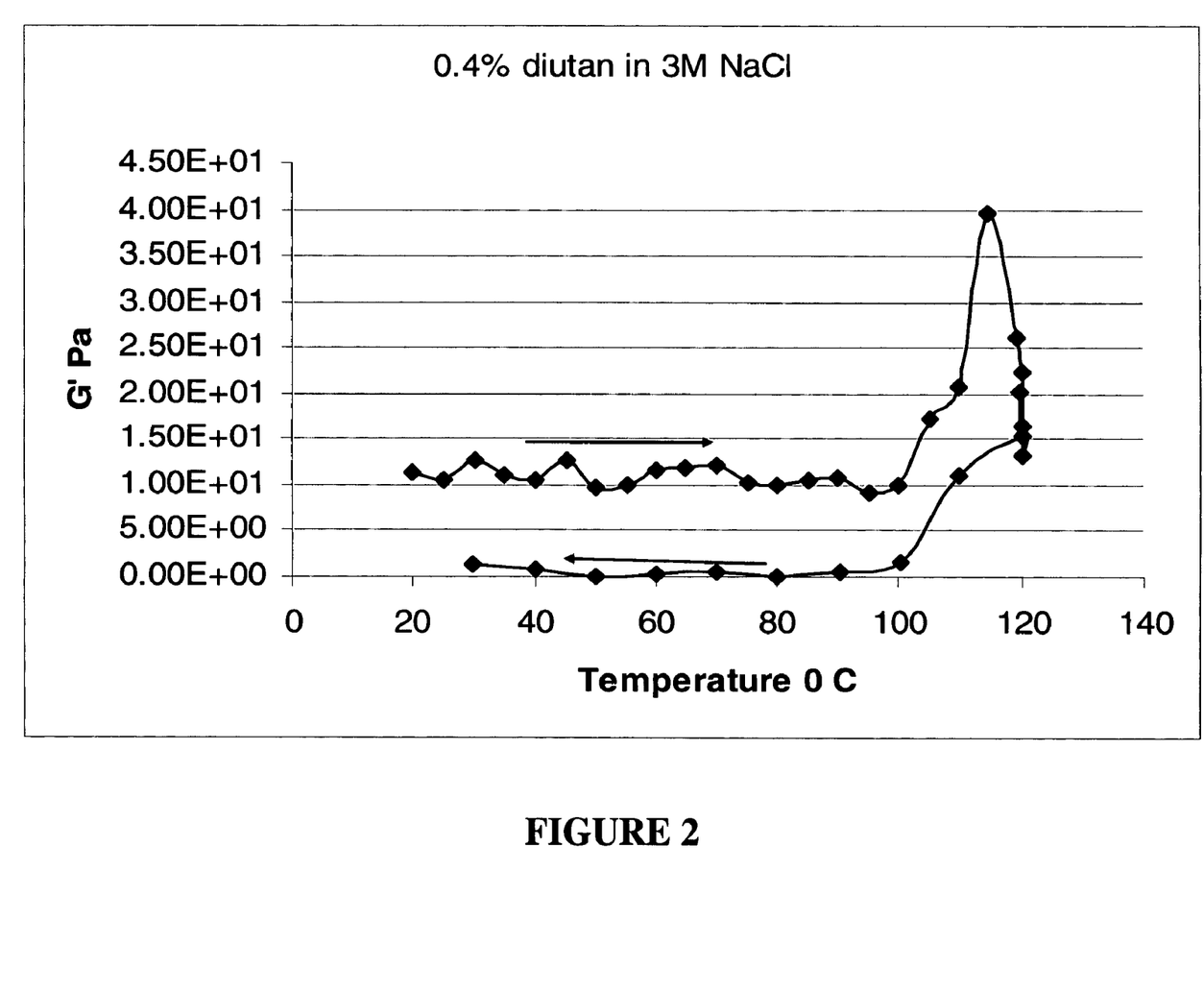
FIG. 2 illustrates a graph of the elastic modulus of a 0.4% solution of diutan in 3M sodium chloride (NaCl)

Turning to FIG. 2, illustrated is a graph of the elastic modulus of a 0.4% solution of diutan in 3M sodium chloride. As indicated, a gel was formed at a temperature of about 100° C. The elastic modulus increased to about 40 Pa, and decreased to near 0 Pa upon cooling below 100° C. On cooling to the same temperature in the heating cycle at 30° C., the recovered elastic modulus did not recover to its original elastic modulus value. Without being limited by theory, it is believed that the recovered elastic modulus did not recover to its original value due to the polymer forming a precipitate above 100° C. Thus, the diutan polymer formed a gel at the lower temperatures until reaching about 100° C., when the diutan polymer precipitated, unable to reach the original elastic modulus when returning to about 30° C., the lower temperatures in the heating cycle.

Figure 3:
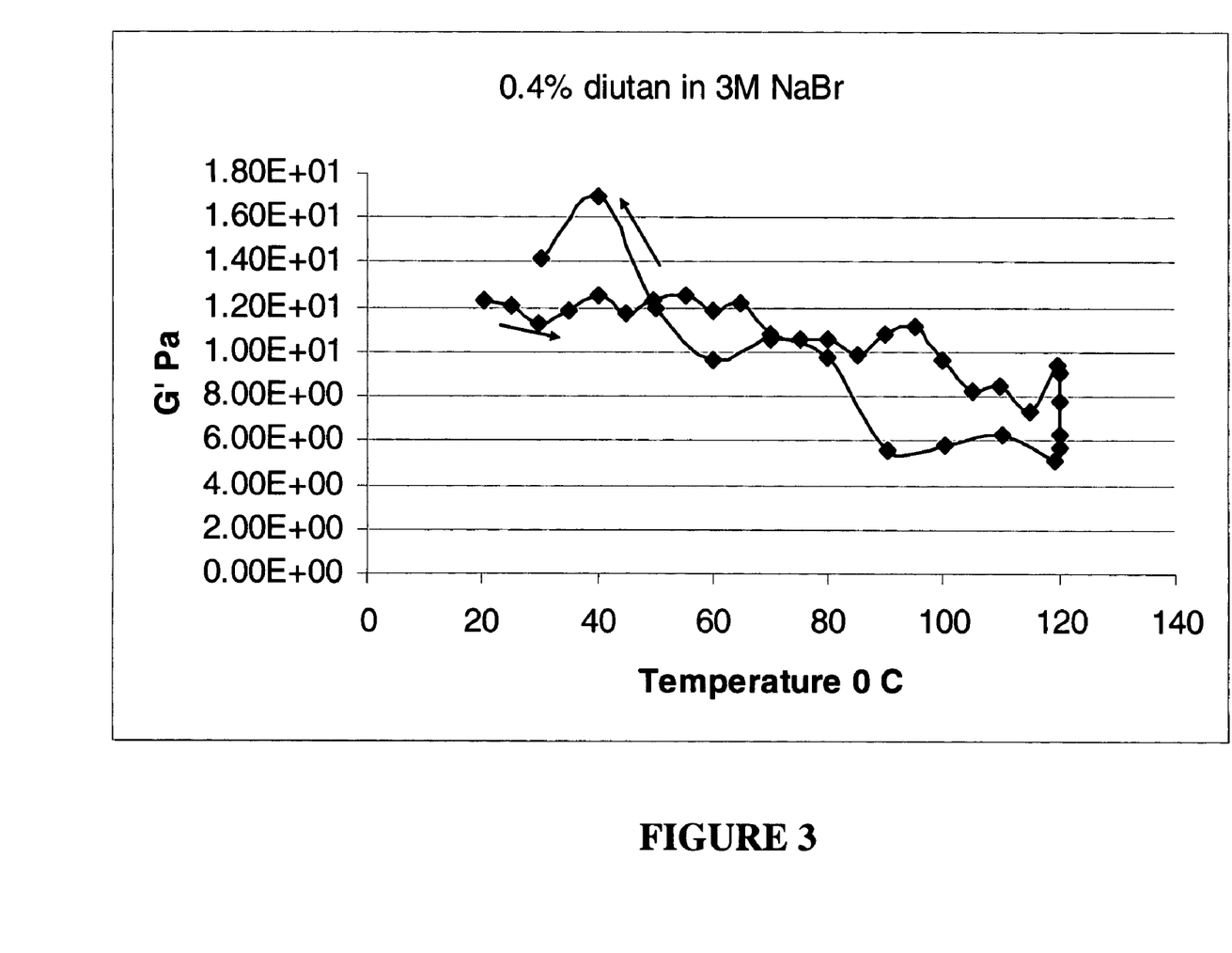
FIG. 3 illustrates a graph of the elastic modulus of a 0.4% solution of diutan in 3M sodium bromide (NaBr)

Turning now to FIG. 3, illustrated is a graph of the elastic modulus of a 0.4% solution of diutan in 3M sodium bromide. Although the elastic modulus decreases with increasing temperature, the recovered elastic modulus value is recovered to at least the value of the original elastic modulus on cooling to about 30° C. It is believed that the recovered elastic modulus is recovered to at least the value of the original elastic modulus on cooling because the diutan polymer does not form a precipitate at the higher temperatures.

Figure 4:
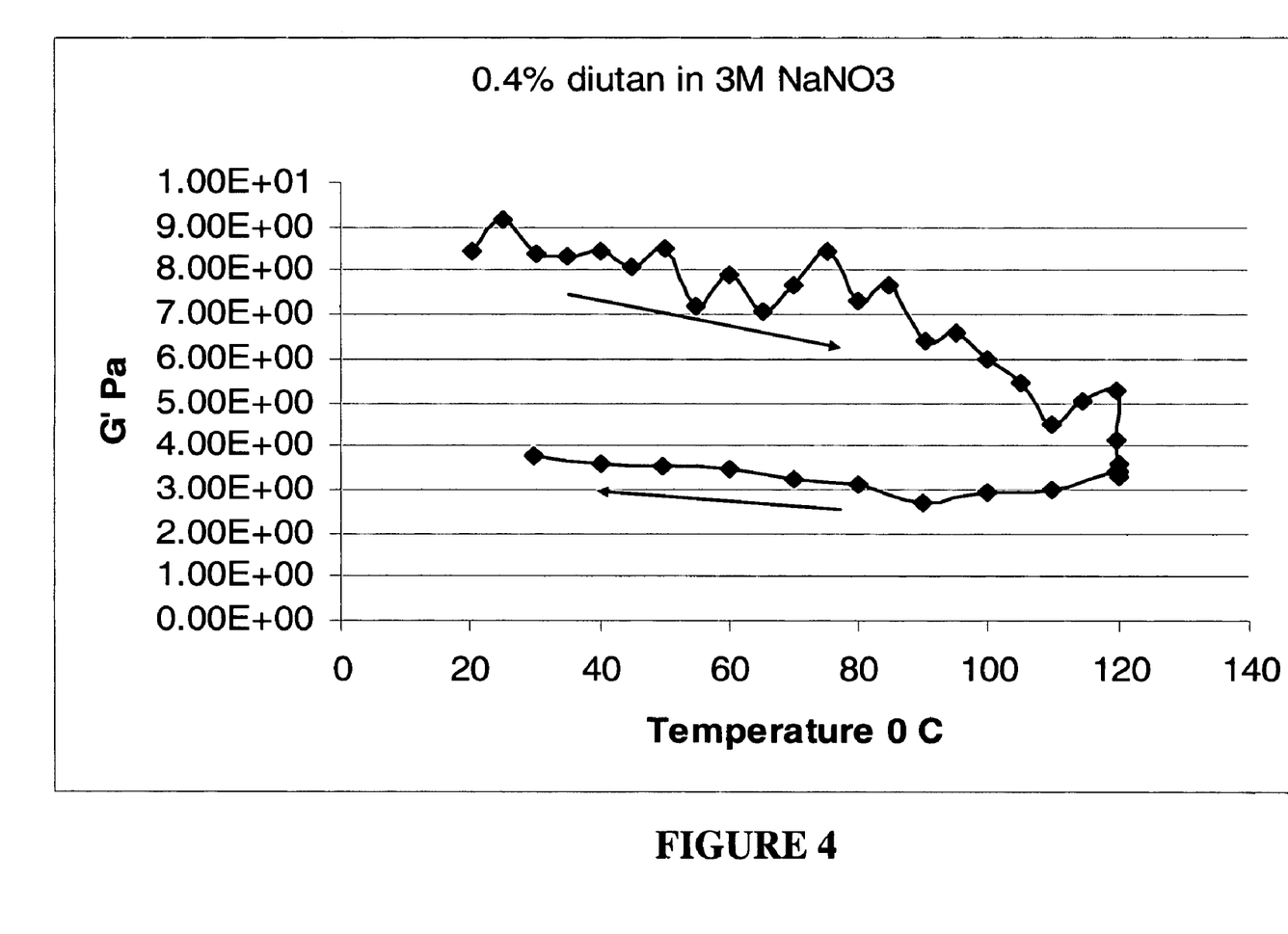
FIG. 4 illustrates a graph of the elastic modulus of a 0.4% solution of diutan in 3M sodium nitrate ($NaNO_3$)

FIG. 4 illustrates a graph of the elastic modulus of a 0.4% solution of diutan in 3M sodium nitrate. Similar to the irreversible behavior of 3M sodium chloride illustrated in FIG. 3, the temperature-irreversible behavior of the diutan polymer in 3M sodium nitrate is believed to be due to the precipitation of the diutan polymer at higher temperatures.

Figure 5:
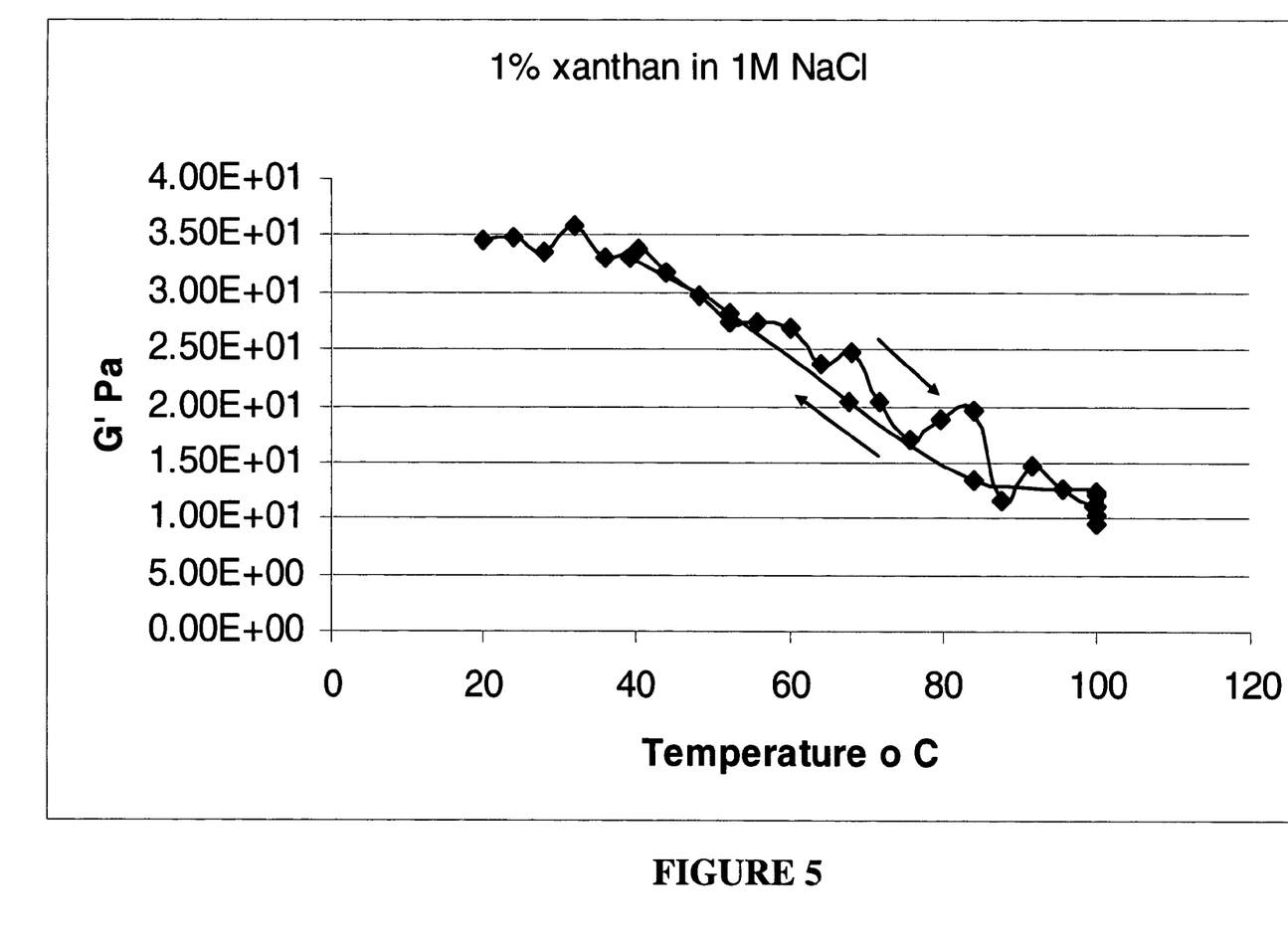
FIG. 5 illustrates the elastic modulus of a 1% solution of xanthan in 1M sodium chloride (NaCl)

FIG. 5 illustrates the elastic modulus of a 1% solution of xanthan in 1M sodium chloride. On cooling the solution, the recovered elastic modulus value is nearly the same value of the original elastic modulus. The xanthan polymer does not form a precipitate at higher temperatures, thus the recovered elastic modulus is at nearly the same value as the original elastic modulus on returning to cooler temperatures in the heating cycle. This behavior is contrary to behavior of diutan in sodium chloride, which is illustrated in FIG. 2. For this reason, the invention provides the advantage of selecting salts having higher salting-in effect for treatment fluids in order to avoid precipitation of the diutan at higher temperatures.

Figure 6:
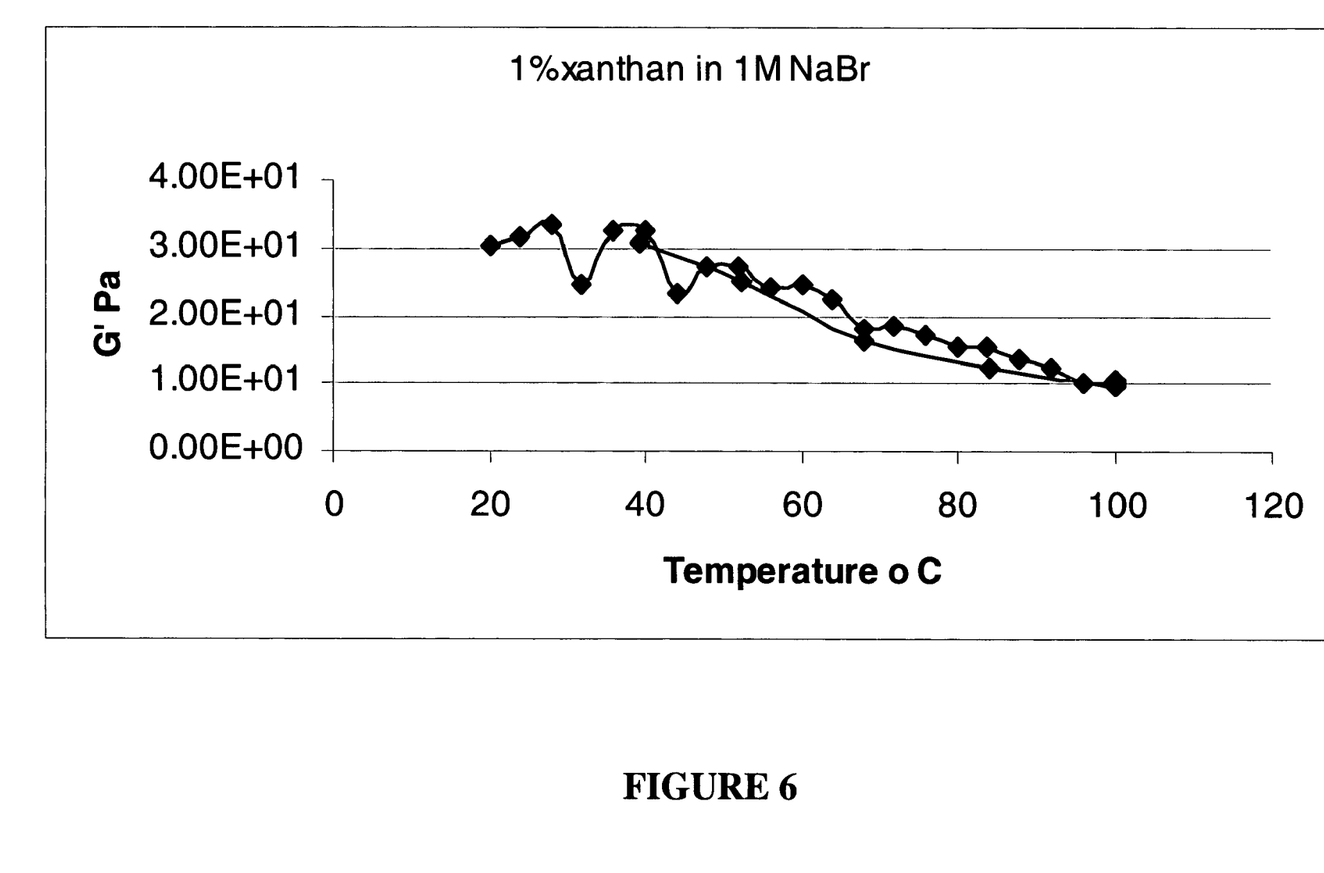
FIG. 6 illustrates the elastic modulus of a 1% solution of xanthan in 1M sodium bromide (NaBr)

FIG. 6 illustrates the elastic modulus of a solution of xanthan in 1M sodium bromide. The recovered elastic modulus value is nearly the same value as the original elastic modulus on cooling the solution because xanthan, like diutan, does not form a precipitate at the higher temperature.

As indicated by the rheological data of FIGS. 2-4, the elastic modulus of diutan is quite dependent on the salt type. In contrast, the elastic modulus of xanthan in the different salt solutions of sodium chloride and sodium bromide are shown in FIG. 5 and FIG. 6. In both FIG. 5 and FIG. 6, the moduli are quite reversible, indicating that xanthan behaves no differently in sodium chloride than in sodium bromide, as distinguished with the diutan results.

In one aspect of the invention, the treatment fluid comprises a sufficient amount of salt to increase the density of the treatment fluid to at least 8.5 lb/gal, wherein the salt is selected such that a test solution for the salt comprising 0.4 weight percent of the diutan in a 3 molar solution of the salt in de-ionized water has: i) an original elastic modulus measured at 20° C., and ii) a recovered elastic modulus measured at 20° C. after the test solution has been gradually heated from 20° C. to 120° C. at an overall rate of about 3° C. per minute over a period of about 30 minutes, held at 120° C. for about 10 minutes, and cooled from 120° C. back down to 20° C. at an overall rate of about minus 3° C. per minute over about 30 minutes, and then held at 20° C. for about 30 minutes; wherein the recovered elastic modulus is at least half the original elastic modulus. Preferably, the recovered elastic modulus is about equal or greater than the original elastic modulus.

Figure 7:
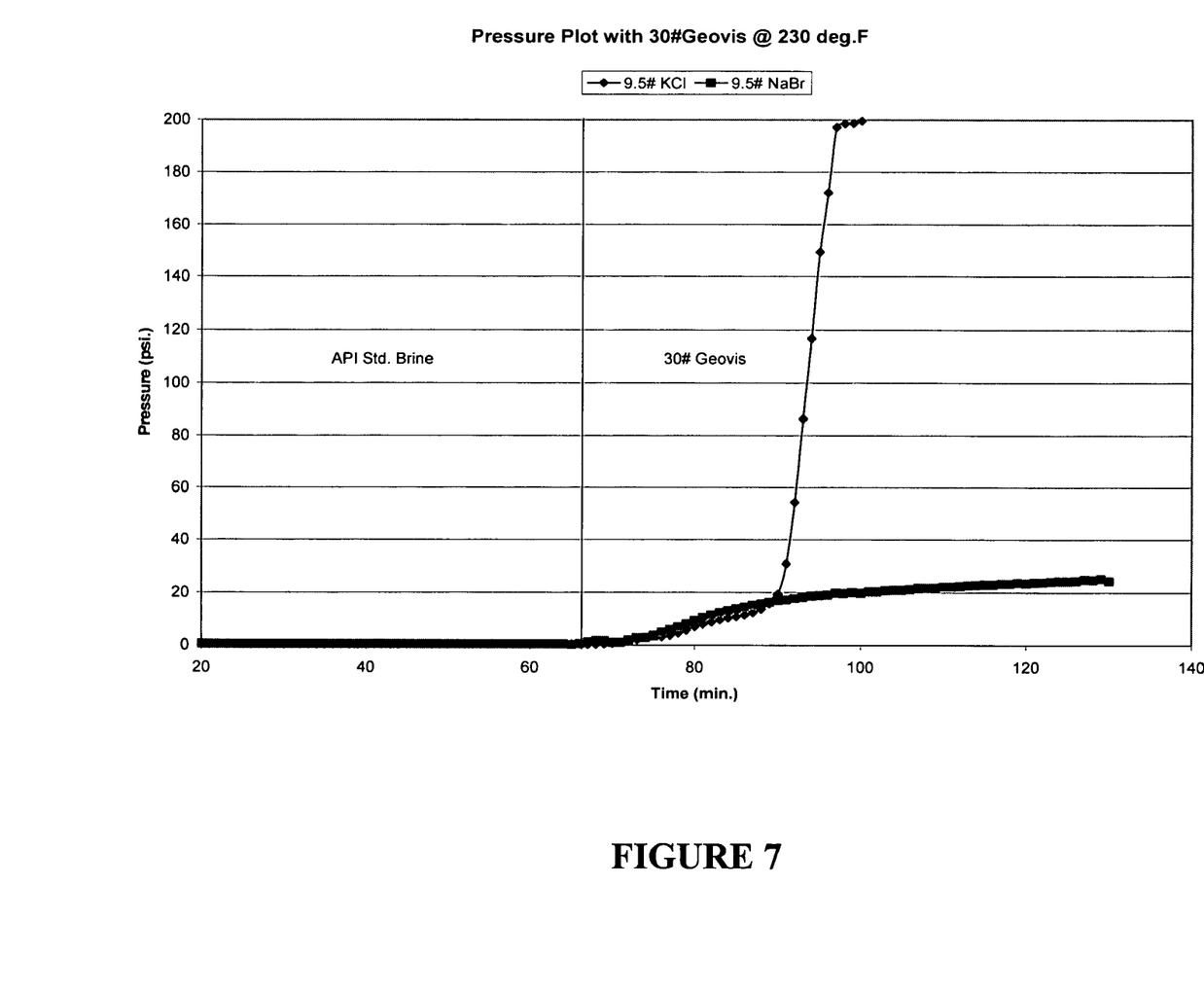
FIG. 7 illustrates another technique for showing the difference in behavior of diutan in potassium chloride (KCl) versus sodium bromide by the extent of blockage of diutan and salt solutions when pumped through rock cores at 110° C.

Turning now to FIG. 7, illustrated is another technique to show the difference in behavior of diutan in potassium chloride compared to sodium bromide by the extent of blockage of the permeable rock cores when diutan and salt solutions are pumped through the cores at 110° C. The pressure is measured from pumping brine followed by diutan (0.36%) (Geovis) solution through rock cores (permeability 700 mD). The diutan solution that was tested was a solution with potassium chloride (9.5 lb/gal) salt solution and sodium bromide (9.5 lb/gal) salt solution, tested both at 230° F. Experimentally, a one inch diameter rock core of brown sandstone, having a permeability of about 700 milliDarcy (mD), was inserted into a Hassler sleeve apparatus, so the liquids could be pumped through the core. An overburden pressure of 500 pounds per square inch (psi) was maintained on the Hassler sleeve, and a back pressure regulator was set at 200 psi. The computer controlled pump used for passing fluids through the core was also set not to exceed 200 psi. The temperatures of the sleeve and fluids were controlled. Once the core had reached the desired temperature (here, 110° C.), the brine was pumped through the core at 2 ml/min until constant pressure across the core was reached. The treating fluid (here, 0.36% diutan with potassium chloride at 9.5 lb/gal or sodium bromide at 9.5 lb/gal salt) was then pumped through the core at 1 ml/min in the same direction as the brine until either 10 pore volumes had passed or the pressure reached 200 psi.

The results show that diutan in the presence of potassium chloride salt solution blocks the pores, causing the pressure to rise to 200 psi, whereas diutan in sodium bromide salt solution does not block the pores to any significant extent and 10 pore volumes passed through at a pressure rising to about 25 psi. The data correlates well with the rheological behavior, showing that diutan in concentrated chloride solution forms a precipitate above about 100° C., whereas diutan stays in solution in concentrated bromide solution. The pressure buildup for the diutan in sodium bromide solution is not greater than 20 psi; it can be pumped through the rock core with ease, which is indicated by the small pressure increase through the rock core. In contrast, the pressure build up for the diutan in potassium chloride solution quickly increases to pressures significantly above 20 psi. Without being limited by theory, it is believed that this significant build up in pressure with respect to the potassium chloride salt solution is due to the precipitation of diutan, causing the rock core to be plugged up.

Figure 8:
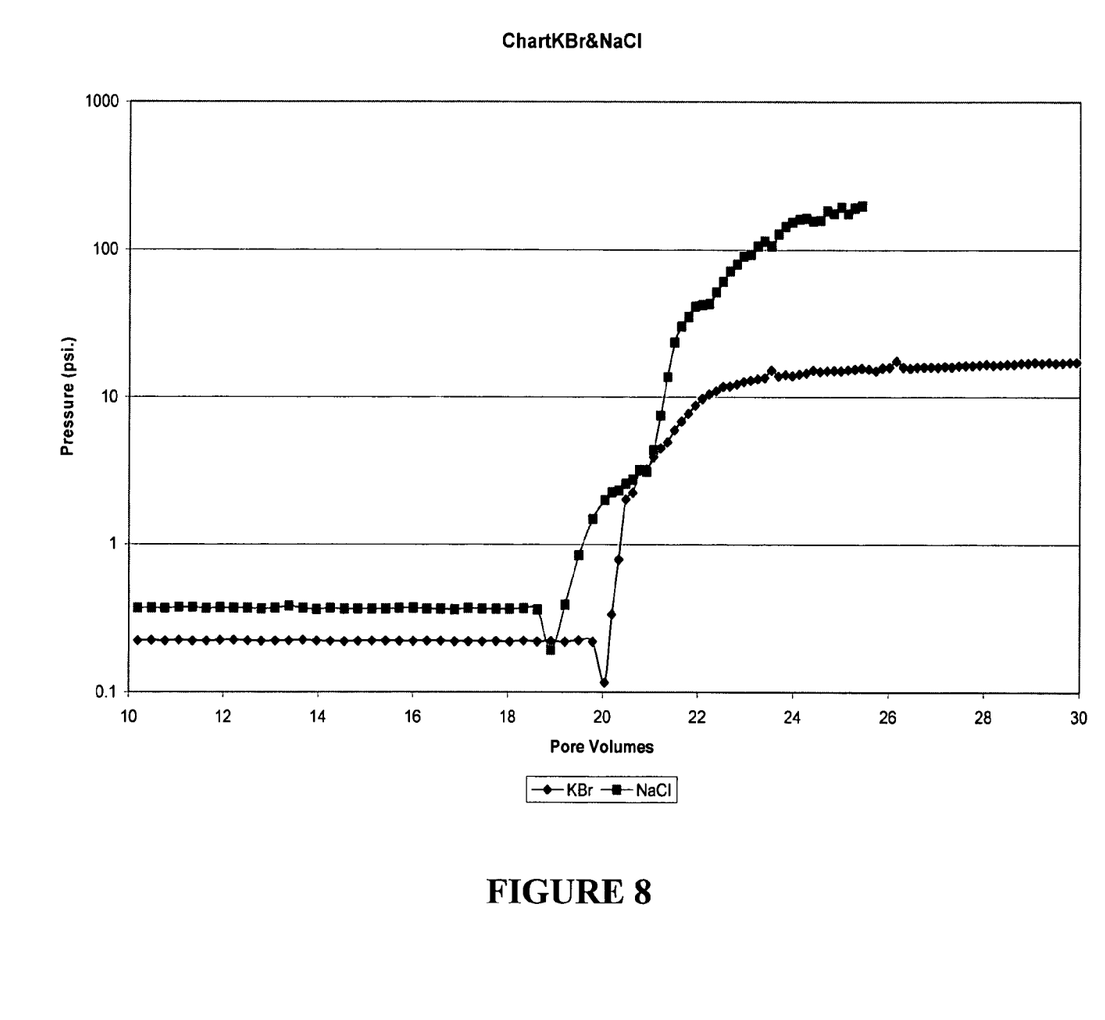
FIG. 8 illustrates, as in FIG. 7, a technique for showing the difference in behavior of diutan in sodium chloride versus potassium bromide by the extent of blockage of diutan and salt solutions when pumped through rock cores at 110° C.

Turning now to FIG. 8, illustrated is a technique used in FIG. 7 for showing the difference in behavior of diutan in sodium chloride salt solution versus potassium bromide salt solution by the extent of blockage of diutan and salt solutions when pumped through rock cores at 110° C. Specifically, illustrated is a graph of the pressure from pumping brine followed by diutan (0.36%) (Geovis) solution through rock cores (permeability 700 mD); diutan is solubilized in sodium chloride (9.5 lb/gal) salt solution or potassium bromide (9.5 lb/gal) salt solution at 230° F. FIG. 8 shows similar data to that of FIG. 7, except that the systems used were diutan (0.36%) in potassium bromide and sodium chloride, both at 9.6 lb/gal. The data show that diutan was able to be pumped through the rock in sodium bromide salt solution but not in sodium chloride salt solution. Comparison of FIG. 5 and FIG. 6 shows that it is the chloride ion that causes the diutan to block the rock, whereas the bromide ion allows the diutan to be pumped.

The polymeric system can be degraded easily once the operation is complete. Degradation of treatment fluids containing diutan in applications such as gravel packing may be facilitated by systems described in U.S. patent application Ser. No. 10/850,128, Publication No. US 2005/0261138, herein incorporated by reference in its entirety.

Treatment fluids of the invention may be used in a variety of well applications. Typical well applications include, but are not limited to, a brine thickener in drilling muds and workover fluids, a viscosifying agent in hydraulic fracturing, gravel packing and frac packing operations, cementing, a gel blocking agent in diverting applications and in non-petroleum applications such as a clarifier for use in refining processes. Thus, the treatment fluid can be accompanied by a propping agent that results in the placement of proppants within a fracture produced in hydraulic fracturing. The fluid can also be used as a temporary blocking gel, also formed by gelation and crosslinking of appropriate polysaccharides such as diutan, producing a relatively impermeable barrier across the production formation. These gels can also be used as diverting agents during stimulation treatments. In this capacity, the gels are typically pumped into a formation ahead of a stimulation fluid, such as an acid stimulation fluid. These gels selectively enter the more permeable zones of the formation, where they create a relatively impermeable barrier across the more permeable zones of the formation, thus serving to divert the stimulation fluid into the less permeable portions of the formation.

As mentioned above, the treatment fluids of the invention can be used to thicken fluids for sand suspension. In this capacity, they can be used with sand or small gravel, such as in gravel packing fluids. Gravel packing controls sand migration from unconsolidated or poorly consolidated formations through the placement of a gravel pack around a slotted or perforated liner or screen liner inserted at a specific location within a perforated wellbore. The "gravel" is usually sand or gravel that excludes the formation sand from entering the wellbore. In gravel packing, sand is transported downhole in a liquid that contains a viscosifying agent. The liquid is preferably clean (i.e. does not contain insoluble or gelled material that can plug or damage the formation), and still be capable of suspending sand at a broad range of temperatures. It should be understood by those skilled in the art that the fluids can also contain other conventional additives common to the well service industry.

The invention can also be useful in diutan applications including, but not limited to, the food industry, the agricultural industry, and a wide variety of other industrial diutan applications. The invention is advantageous to these industrial applications because there is a need for diutan to have the ability to withstand high temperatures in salt solutions.

After careful consideration of the specific and exemplary embodiments of the present invention described herein, a person of ordinary skill in the art will appreciate that certain modifications, substitutions and other changes may be made without substantially deviating from the principles of the present invention. The detailed description is illustrative, the spirit and scope of the invention being limited only by the appended Claims.

What is claimed is:

1. A method for treating a subterranean formation penetrated by a wellbore, the method comprising the steps of:
   a. formulating an aqueous treatment fluid comprising:
      i. water;
      ii. diutan; and
      iii. a sufficient amount of salt to provide a salt solution of the water having a density of at least 8.5 lb/gal, wherein at least 50% by weight of the salt is selected from the group consisting of:
         (a) bromide salts,
         (b) non-bromide salts having a higher salting-in effect than bromide according to the Hofmeister series as measured by the salt's effect on the cloud point of poly(ethylene oxide) that has a molecular weight of $4 \times 10^6$, and
         (c) any combination in any proportion thereof;
   b. introducing the treatment fluid through the wellbore.

2. The method according to claim 1, wherein the salt is selected such that a test solution for the salt comprising 0.4 weight percent of the diutan in a 3 molar solution of the salt in de-ionized water has:
   a. an original elastic modulus measured at 20° C.; and
   b. a recovered elastic modulus measured at 20° C. after the test solution has been:
      i. gradually heated from 20° C. to 120° C. at an overall rate of about 3.33° C. per minute over a period of about 30 minutes,
      ii. held at 120° C. for about 10 minutes,
      iii. cooled from 120° C. back down to 20° C. at an overall rate of about minus 3.33° C. per minute over about 30 minutes, and then
      iv. held at 20° C. for about 30 minutes;
wherein the recovered elastic modulus is at least half the original elastic modulus.

3. The method according to claim 1, wherein the salt comprises at least 50% by weight of salt selected from the group consisting of potassium bromide, sodium bromide, ammonium bromide, zinc bromide, and calcium bromide.

4. The method according to claim 1, wherein the diutan is present in the treatment fluid in an amount from about 0.01% to about 2.0% by weight.

5. The method according to claims 1, wherein the treatment fluid further comprises a particulate.

6. The method according to claim 5, wherein the particulate comprises sand.

7. A method for treating a subterranean formation penetrated by a wellbore, the method comprising the steps of:
   a. formulating an aqueous treatment fluid comprising:
      i. water;
      ii. diutan, wherein the diutan is present in the treatment fluid in an amount from about 0.01% to about 2.0% by weight;
      iii. a sufficient amount of salt to provide a salt solution of the water having a density of at least 8.5 lb/gal, wherein the salt is selected such that a test solution for the salt comprising 0.4 weight percent of the diutan in a 3 molar solution of the salt in de-ionized water has:
         (a) an original elastic modulus measured at 20° C., and
         (b) a recovered elastic modulus measured at 20° C. after the test solution has been:
            (i) gradually heated from 20° C. to 120° C. at an overall rate of about 3.33° C. per minute over a period of about 30 minutes,
            (ii) held at 120° C. for about 10 minutes,
            (iii) cooled from 120° C. back down to 20° C. at an overall rate of about minus 3.33° C. per minute over about 30 minutes, and the
            (iv) held at 20° C. for about 30 minutes,
         wherein the recovered elastic modulus is at least half the original elastic modulus;
   b. introducing the treatment fluid through the wellbore.

8. The method according to claim 7, wherein the recovered elastic modulus is about equal or greater than the original elastic modulus.

9. The method according to claim 7, wherein the salt comprises at least 50% by weight of salt selected from the group consisting of potassium bromide, sodium bromide, ammonium bromide, zinc bromide, and calcium bromide.

10. The method according to claim 7, wherein the treatment fluid further comprises a particulate.

* * * * *

UNITED STATES PATENT AND TRADEMARK OFFICE
CERTIFICATE OF CORRECTION

PATENT NO.        : 7,595,282 B2                    Page 1 of 1
APPLICATION NO.   : 11/077881
DATED             : September 29, 2009
INVENTOR(S)       : Pauls et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 703 days.

Signed and Sealed this

Twenty-eighth Day of September, 2010

David J. Kappos
*Director of the United States Patent and Trademark Office*